(12) United States Patent
Mitchell et al.

(10) Patent No.: US 6,279,496 B1
(45) Date of Patent: Aug. 28, 2001

(54) SEED PLANTER

(76) Inventors: Hollis D. Mitchell; Marie E. Mitchell, both of 321 Lee 802, Marianna, AR (US) 72360-9189

( * ) Notice: Subject to any disclaimer, the term of this patent is extended or adjusted under 35 U.S.C. 154(b) by 0 days.

(21) Appl. No.: 09/425,148

(22) Filed: Oct. 21, 1999

(51) Int. Cl.$^7$ ................................................... A01C 5/02
(52) U.S. Cl. ................................................... 111/92; 7/114
(58) Field of Search .............................. 111/92, 89, 106; 7/114, 116; 222/175, 608, 611.1

(56) References Cited

U.S. PATENT DOCUMENTS

| | | |
|---|---|---|
| 431,841 | 7/1890 | Davis . |
| 1,830,283 | 11/1931 | Madderra . |
| 2,248,176 * | 7/1941 | Johnson ................................. 111/92 |
| 2,767,820 * | 10/1956 | Ramsey .............................. 111/92 X |
| 3,797,417 * | 3/1974 | Hahn .................................. 111/92 X |
| 4,114,543 | 9/1978 | Mitchell ................................ 111/96 |
| 4,123,980 * | 11/1978 | Winston ................................. 111/92 |
| 4,165,697 | 8/1979 | Yeager et al. ........................... 111/92 |
| 4,206,714 | 6/1980 | Walsh ................................... 111/92 |
| 4,218,981 | 8/1980 | Kelly ................................... 111/89 |
| 4,290,374 | 9/1981 | Maples ................................. 111/92 |
| 4,694,760 | 9/1987 | Camp ................................... 111/92 |
| 4,736,694 * | 4/1988 | Kratky et al. ....................... 111/92 X |
| 4,760,807 | 8/1988 | Keller .................................. 111/92 |
| 4,896,797 | 1/1990 | Tumlin ................................ 222/175 |
| 4,932,339 * | 6/1990 | List .................................. 111/92 X |
| 5,131,570 | 7/1992 | Sawyer, III ........................... 222/175 |
| 5,325,798 * | 7/1994 | Nowell et al. ...................... 111/92 X |
| 5,471,939 | 12/1995 | Chancey .............................. 111/107 |
| 5,493,977 | 2/1996 | Maisch ................................. 111/92 |
| 5,584,256 | 12/1996 | Fleming ................................ 111/92 |
| 5,924,369 * | 7/1999 | Hatcher ................................ 111/92 |

FOREIGN PATENT DOCUMENTS

562768 * 3/1957 (IT) ....................................... 111/92

* cited by examiner

*Primary Examiner*—Christopher J. Novosad
(74) *Attorney, Agent, or Firm*—Garvey, Smith, Nehrbass & Doody LLC

(57) ABSTRACT

A seed planting apparatus includes an elongated planter member having an upper end portion and a lower end portion. An elongated seed delivery tube is positioned next to the planter, the tube having a bore and an outlet. The lower end portion of the planter member has an end that is preferably frustoconically shaped, providing a flat lower surface and a tapered side wall. The lower end portion of the planter member can be in the form of a truncated pyramid. The delivery tube has a lower end portion with an outlet that communicates with the bore and that is so positioned that when a user drops a seed into the tube, the seed exits the tube at the outlet above the lower end portion of the delivery tube so that it falls next to the lower end portion of the planter member which can be positioned into a cavity that was formed by the lower end portion of the planter member.

5 Claims, 2 Drawing Sheets

SEED PLANTER

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to hand-held seed planter devices and more particularly to an improved, hand-held seed planter that features a staff or shaft with an attached seed delivery tube, the lower end portion of the staff being specially shaped to compress a soil mass both underneath and on the side of a cavity that receives the seed to be planted.

2. General Background of the Invention

The effective planting of seed requires preparation of the seed base. A seed has an enhanced chance of success if the cavity that receives the seed has compacted soil, both under and around the seed.

Patents have issued for hand held mechanical devices that enable a user to plant seed. One example of such a device is U.S. Pat. No. 5,471,939 issued to Chancey. The Chancey patent discloses a seed planter having a seed drop tube entrance opening connected to a seed drop tube with a planter assembly leading to a seed release bracket and lever assembly. The device includes a hinged soil penetrator and seed release gate assembly.

Other manually operated seed planters include U.S. Pat. No. 5,493,977 to Maisch; U.S. Pat. No. 4,114,543 issued to Mitchell; U.S. Pat. No. 4,218,981 issued to Kelly; U.S. Pat. No. 4,165,697 issued to Yeager; U.S. Pat. No. 4,206,714 issued to Walsh; U.S. Pat. No. 4,290,374 issued to Maple; U.S. Pat. No. 4,694,760 issued to Camp; U.S. Pat. No. 4,760,807 issued to Keller; and U.S. Pat. No. 4,896,797 issued to Tumlin.

Other patents that disclose devices that dispense seeds include, as examples, U.S. Pat. Nos. 431,841; 1,830,283; 5,131,570; and 5,584,256.

Many of these patents are complicated to construct and to use. Many require expensive springs and levers and/or valve members that need to open in order to dispense the seeds. Some have complicated linkage that requires hand operation in order to dispense seeds at the opposing end of the device.

BRIEF SUMMARY OF THE INVENTION

The present invention provides an improved seed planter having a simple construction, particularly in that there is an absence of any moving parts. The absence of such moving parts in a device of this type is valuable because of the environment in which it is used, namely in soil and around moisture. The construction of the present invention ensures that it is less likely to become fouled and inoperative.

The present invention is a simple apparatus that differs from the above-discussed prior art patents that suffer from too many operating parts, or overly complex construction.

Another problem with many of the prior art patents referred to above is that such devices provide a tube that supplies the seed to be planted, wherein the delivery tube itself is inserted into the ground in order to form the cavity for the seed. In such a situation, the lower end of the dispensing tube can commonly clog or foul and become inoperative.

The present invention provides an improved planting apparatus that features a staff or rod having a lower distal end portion that is a tapered, such as a truncated cone or a frustoconical member. In one embodiment, the lower end portion of the rod or staff is a truncated pyramid that can be an oval or rectangular cross section. The present invention easily functions to both form a cavity and plant a seed using a separate rod and delivery tube arrangement.

The rod is pushed into the ground to form a cavity. The flat, distal end of the rod compacts the soil under the plant site. The tapered side wall of the lower end of the rod compacts soil that surrounds the seed. In this fashion, when the seed is released from the tube into the planting site, it actually rests on top of compacted soil and is surrounded by compacted soil. Such a compacted bed is important for the seed to be able to germinate rapidly and establish a good firm root structure, grow, and nominally retain moisture in the indentation formed.

The present invention thus provides a tapered lower end portion which not only compacts the soil under the plant site but also around the plant site to thereby retain moisture in the period immediately following planting of the seed contributing to the early germination of the seed.

The apparatus of the present invention provides a supporting rod structure with an adaptive tip for preparing the seed bed when the rod is pressed into the soil a desired depth. The rod is then retracted so that the seed delivery tube discharge opening can be placed adjacent the hole that was formed by the lower, shaped end portion of the rod.

The seed traverses the seed delivery tube from the top of the tube. The seed is discharged from an outlet or discharge opening at the lower end of the delivery tube, and into the plant site. The conduit or seed delivery tube can have a funnel at the top for facilitating receipt of the seed to be planted.

One of the features of the present invention is that the discharge outlet at the lower end of the tube is never inserted into the ground to become clogged or fouled. Likewise, there are no moving parts to bind, rust or otherwise become non-functional because of the influence of soil, moisture and the like.

The present invention thus provides a simple, easy to use yet rugged construction for a seed planter that plants seeds with simple, one-handed operation to promote easier growth for the seed and plant.

The lower end portion of the device provides a tapered end with a flat extreme lower end. This construction opens the soil and promotes growth by providing a flat spot for the seed and a conically shaped side wall for the seed cavity.

The seed planting apparatus of the present invention includes an elongated planter rod member having an upper end portion and a lower end portion.

An elongated seed delivery tube is positioned next to the planter, the tube having a bore and an outlet.

The outlet is preferably positioned above the lower end portion of the planter member. The planter member has a lower end portion that is preferably a truncated cone or a frustoconical shape. The end of the planter member thus provides an end and a tapered side wall. The end portion is preferably flat and can be circular, oval or rectangular in shape. The delivery tube has a lower end portion with an outlet that communicates with the bore of the delivery tube and that is so positioned that when a user drops a seed into the tube, the seed exits the tube at the outlet and falls next to the lower end portion of the planter member.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
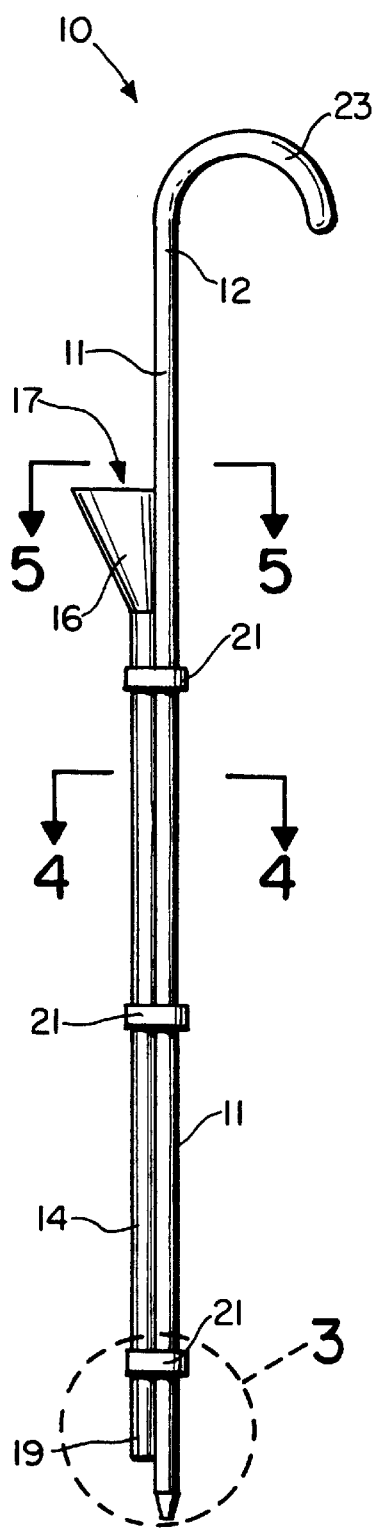
FIG. 1 is a side elevational view of the preferred embodiment of the apparatus of the present invention.
Figure 2:
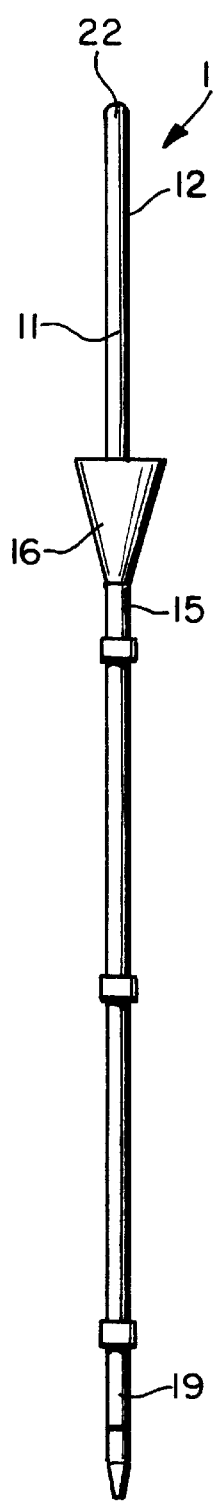
FIG. 2 is another side elevational view of the preferred embodiment of the apparatus of the present invention.
Figure 3:
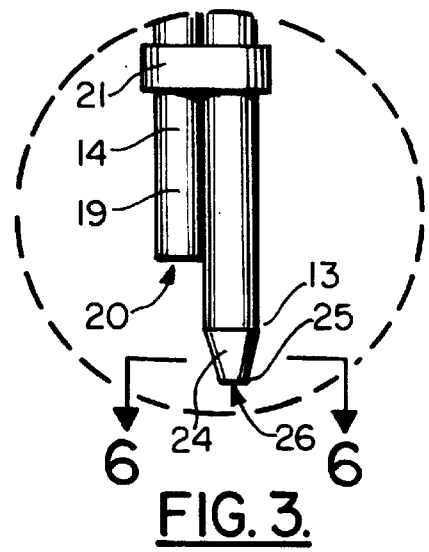
FIG. 3 is an elevational, fragmentary view of the lower end portion of the preferred embodiment of the apparatus of the present invention.
Figure 4:
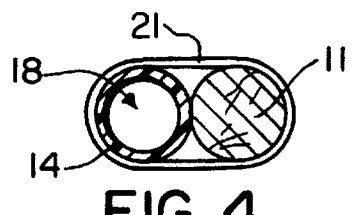
FIG. 4 is a sectional view taken along lines 4—4 of FIG. 1.
Figure 5:
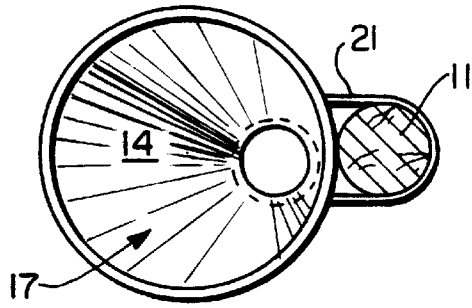
FIG. 5 is a sectional view taken along lines 5—5 of FIG. 1.
Figure 6:
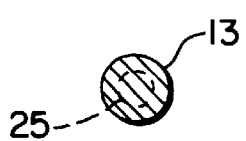
FIG. 6 is a sectional view taken along lines 6—6 of FIG. 3.

FIGS. 1–2 show the preferred embodiment of the apparatus of the present invention, designated generally by the numeral 10. Seed planter 10 is comprised generally of seed delivery tube 14 and planting rod or staff 11 having a specially shaped lower end portion 13. Staff 11 has upper end 12 providing a handle that can be elongated and straight handle 22 or a curved handle 23.

A plurality of straps or bands 21 can be used to hold staff 11 and tube 14 together in side by side position. A bag (not shown) or like container can be supported at upper end 12 of staff 11, preferably just below handle 22 or 23, or just above funnel 16 of tube 14, for containing a plurality of seeds to be planted.

Delivery tube 14 has an upper end portion 15, lower end portion 19 and an open ended bore 18 for seed travel between end portions 15, 19. Funnel 16 at upper end portion 19 provides an open top 17 into which seeds are placed for planting. Lower end portion 19 of tube 15 provides discharge outlet 20 that comnmunicates with bore 18.

When a seed is dropped into open top 17, it travels via bore 18 to outlet 20 and then into an earthen cavity 37 formed by lower end portion 13 of staff 11.

In FIGS. 3, 6 and 8–9, lower end portion 13 of staff 11 has a specially shaped section that produces a desirably shaped cavity 37 (FIG. 9) with soil that has been compacted to promote seed germination and successful plant survival. At lower end 13, a frustoconically shaped section 24 provides circular end 25 having a flat surface 26. Flat surface 26 compacts soil mass 30 that will be directly under the seed 38 to be planted, forming bottom 39 of cavity 37 that receives seed 38. Frustoconical section 24 also provides curved wall 27 that compacts soil mass 30 that will surround seed 38 and form the side wall 40 of earthen cavity 37 that receives seed 38.

Figure 7:
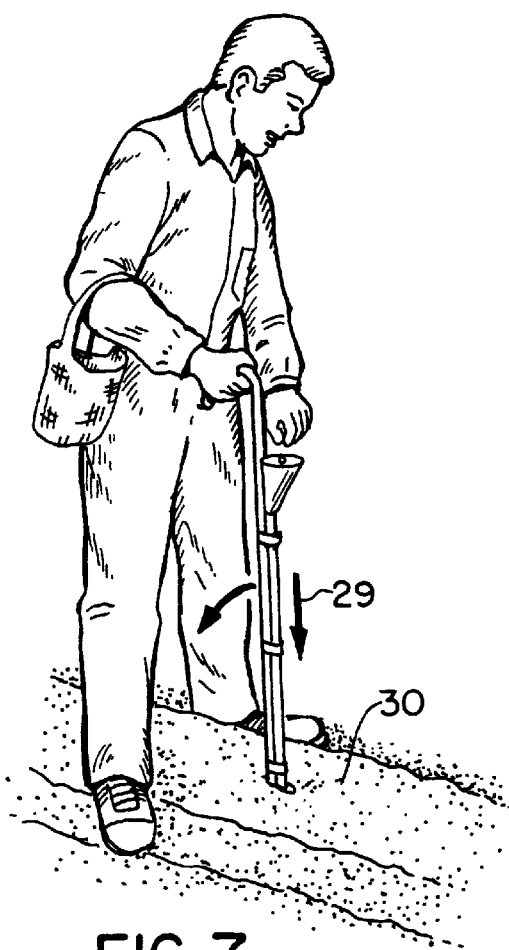
FIG. 7 is a perspective view of the preferred embodiment of the apparatus of the present invention shown during use.
Figure 8:
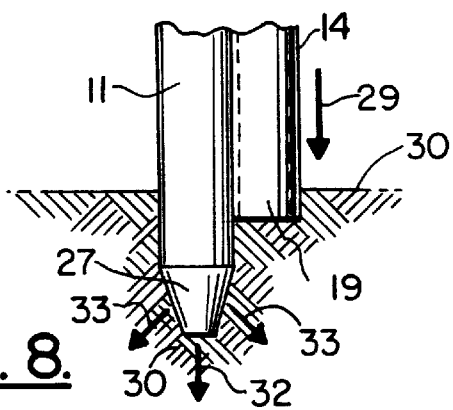
FIG. 8 is a fragmentary elevational view of the preferred embodiment of the apparatus of the present invention shown during a formation of a seed cavity.
Figure 9:
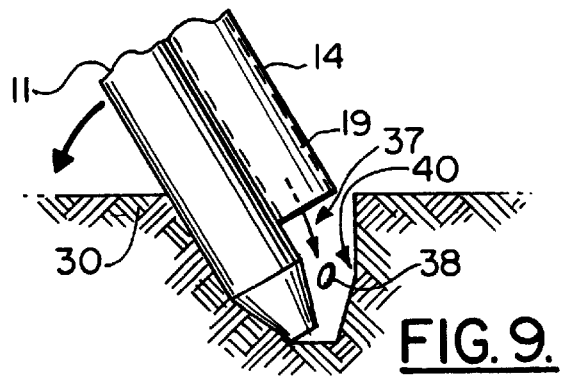
FIG. 9 is a fragmentary elevational view of the preferred embodiment of the apparatus of the present invention showing the lower end portion of the apparatus, during placement of a seed into a seed cavity.

In FIGS. 7–8, arrow 29 illustrates the travel of lower end portion 13 of staff 11 into soil mass 30 when forming an earthen cavity 37. Arrows 32 show compaction of soil mass 30 below flat surface 26 of fustoconical section 24. Arrows 33 show compaction of soil mass 30 laterally of the central longitudinal axis 28 of staff 11.

It has been found by using the apparatus 10 of the present invention, that an earthen cavity having a bottom and sidewalls with compacted soil greatly enhances the early germination of the seed and its chances for successful growth. The compacted soil provides a better support for new roots, while the frustoconical shape of compacted earthen cavity 37 collects, channels and holds moisture from rain or irrigation.

Figure 10:
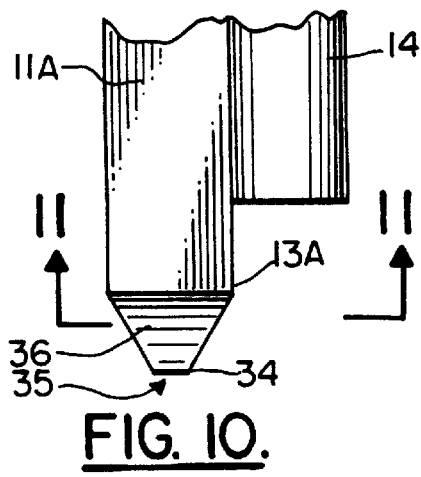
FIG. 10 is a fragmentary view of the preferred embodiment of the apparatus of the present invention showing an alternate construction for the lower end portion of the planter member.
Figure 11:
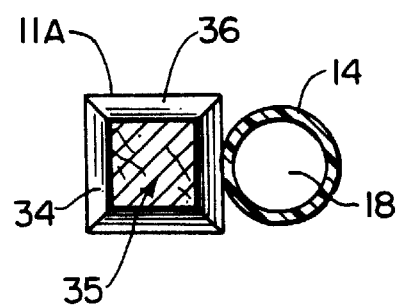
FIG. 11 is a sectional view taken along lines 11—11 of FIG. 10.

In FIGS. 10–11, an alternate construction for the staff and its lower end portion are shown. Staff 11A is square in cross section, providing a lower end portion 13A having square end 24 with flat surface 35. Four flat tapering walls 36 surround square end 34 as shown. The earthen cavity 36 formed by end portion 13A is in the form of a truncated pyramid.

PARTS LIST

| Part Number | Description |
| --- | --- |
| 10 | seed planter |
| 11 | staff |
| 11A | staff |
| 12 | upper end |
| 13 | lower end |
| 14 | delivery tube |
| 15 | upper end |
| 16 | funnel |
| 17 | open top |
| 18 | tube bore |
| 19 | lower end |
| 20 | outlet |
| 21 | strap |
| 22 | handle |
| 23 | curved handle |
| 24 | frustoconical section |
| 25 | circular end |
| 26 | flat surface |
| 27 | curved wall |
| 28 | longitudinal axis |
| 29 | arrow |
| 30 | soil mass |
| 31 | earth's surface |
| 32 | arrows |
| 33 | arrows |
| 34 | square end |
| 35 | flat surface |
| 36 | flat wall |

-continued

PARTS LIST

| Part Number | Description |
|---|---|
| 37 | earthen cavity |
| 38 | seed |

The foregoing embodiments are presented by way of example only; the scope of the present invention is to be limited only by the following claims.

What is claimed is:

1. A seed planting apparatus comprising:
    a) an elongated member having an upper end portion and a lower end portion;
    b) an elongated seed delivery tube that is positioned next to the planter, the tube having a bore, an outlet, an upper end portion, and a lower end portion;
    c) the lower end portion of the planter member having a flat, circular end and a tapered sidewall positioned above the flat end; and
    d) the delivery tube having a lower end with said outlet that communicates with the bore and that is so positioned that when a user drops a seed into the tube, the seed exits the tube at the outlet and falls next to the lower end portion of the planter member.

2. The seed planting apparatus of claim 1 wherein the planter member lower end is frustoconically shaped.

3. The seed planting apparatus of claim 1 wherein the planter member lower end forms a pyramid shape.

4. The seed planting apparatus of claim 1 wherein the upper end of the delivery tube has a funnel with an open top that communicates with the bore.

5. The seed planting apparatus of claim 1 wherein the tube outlet is positioned above the tapered lower end of the planter member.

* * * * *